Oct. 31, 1967     M. J. HIGATSBERGER     3,350,274
MATRIX-TYPE NUCLEAR FUEL ELEMENT INCLUDING FISSION
PRODUCT RETENTIVE MATERIALS
Filed Oct. 26, 1965
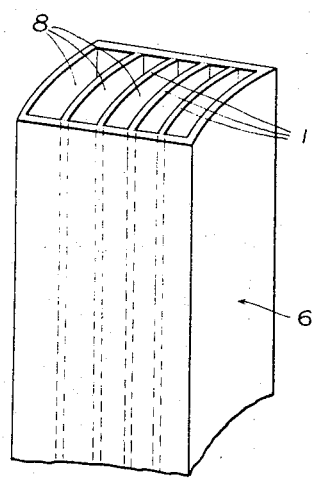
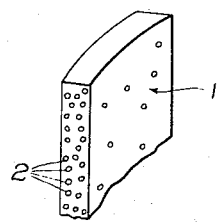
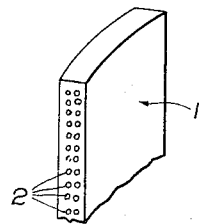
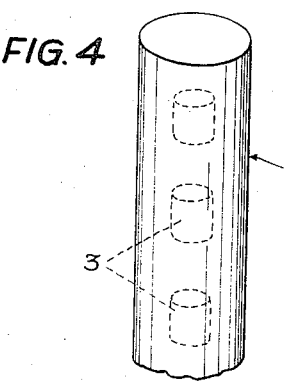
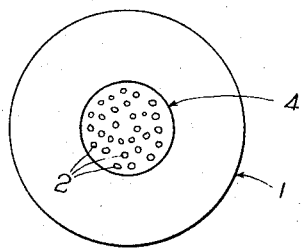
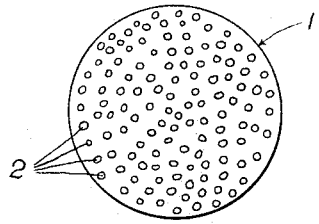
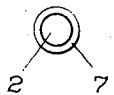
INVENTOR
MICHAEL J. HIGATSBERGER
By: McGlew and Toren,
Attorneys United States Patent Office 3,350,274
Patented Oct. 31, 1967

3,350,274
MATRIX-TYPE NUCLEAR FUEL ELEMENT INCLUDING FISSION PRODUCT RETENTIVE MATERIALS
Michael J. Higatsberger, Vienna, Austria, assignor to Osterreichische Studiengesellschaft fur Atomenergie Ges.m.b.H., Vienna, Austria
Filed Oct. 26, 1965, Ser. No. 517,495
Claims priority, application Austria, Apr. 26, 1963, 3,402/63
3 Claims. (Cl. 176—69)

This application is a continuation-in-part of Ser. No. 359,656, filed Apr. 14, 1964, and now abandoned.

During nuclear capture, nuclear fission and nuclear fusion processes, products having a high specific radioactivity are produced.

For the purpose of preventing contamination of the primary system of nuclear reactors and nuclear power plants, many measures are taken which prevent the escape and interchange of radioactive substances from the confined region of the reactor core.

Processes are known wherein the nuclear fuel substance is alloyed with metals, or is enclosed by substances such as beryllium, zirconium, aluminum, steel or the like for preventing the escape of fission products from the regions of the fuel.

Ceramic materials have been used too, and good fission product retention properties have been achieved with graphite casings which are especially impregnated. In such cases, fillings of nuclear fuels are inserted, for instance, into graphite elements of suitable dimensions and the apertures of such elements are sealed by special methods. An appropriate number of such graphite elements form the reactor core.

The idea of covering small particles of nuclear fuel with covering to retain the fission product uses the same principles. Pyrolytic carbon coatings or envelopes as well as coatings of boride, nitride, selenide, and sulphide have been used for successfully preventing the diffusion of fission products.

The use of ceramics has an advantage in that the nuclear fuel and the fuel elements can be heated to temperatures far in excess of 1000° C., without danger of melting the coatings and effecting a consequent liberation of fission products.

However, there is always a danger that the protective coating may be destroyed, and such may arise from material defects, and/or deficiencies during the production of the coverings, or even on account of exterior mechanical influences. For safety reasons, therefore, costly arrangements have to be provided for ensuring the cleaning of the circuit in the event of a failure of the coatings.

It is an object of the present invention to provide a method which overcomes the disadvantages aforesaid and which prevents the produced fission products from leaving the matrix and contaminating the ambient atmosphere and the reactor system. According to the invention substances are added to the matrix or moderator material wherein the nuclear fuel is embedded, which substances are capable of binding the fission products formed by the fuel. During the nuclear process more than a hundred different fission products being isotopes of a lot of different elements are formed.

The applicant has now found that by addition of small and smallest amounts of silver, beryllium, tantalum, molybdenum, silicon, selenium, zirconium or their compounds for instance their carbides, oxides or nitrides it is possible to bind the fission products so that even at high and highest temperatures the formed compounds remain in the moderator matrix i.e. the fission products and the substances added have to form non-volatile compounds.

The amounts of these substances are dependent on the reactor system, its capacity and its characteristics. It has been proved advantageously to highly disperse the substances added throughout the whole moderator material so that all nuclear fuel is surrounded by these highly dispersed substances.

With respect to the fact that by fission of 1 g. $U^{235}$ an equivalent of energy of 1 mw. per day is gained, the amounts of the added substances are very low, i.e. in the range of the fuel.

It is clear that in most cases it will be necessary to add a combination of two or more of the said substances as one substance is not capable to form non-volatile compounds with all the formed fission products. The character of this combination is dependent on which and to what extent the formed fission products should be bound.

To incorporate such substances is not obvious at all because the presence of these substances reduces the amount of neutrons and thus decreases the energy production. On the other hand, the safety factor is increased to such a significant extent and the expenditure for obtaining such safety is reduced so considerably that the loss in energy production is outweighed.

The fuel elements may be formed in suitable shapes and sizes adapted to the reactor system in which they are to be used, and may incorporate, for example, the fuel substance itself in powdered, particulated, or ball form, such being covered by coverings to retain the fission products and ensure that same remain in the region of the reactor core, even under extreme operating conditions.

The inventive combination of materials, being capable of retaining the fission products and covering the fuel particles directly, and the large surrounding bedding of sintered substance, respectively, facilitates the operation of a reactor, and more particularly, allow a considerable saving of cost, simplify the loading and discharging mechanism thereof, and increase the safety factor.

Fuel elements embodying the invention are not so susceptible to material defects or deficiencies during their production, and even a fracture of the matrix of the fuel element or of the complete fuel element would not have a catastrophic result, as any escaping fission products are safely bounded by the sintered material even at high operating temperatures.

The invention will be further apparent from the following description with reference to the several figures of the accompanying drawing which show, by way of example only, a number of fuel elements embodying the invention.

Of the drawing:
FIG. 1 shows in diagrammatic form a detail of one form of fuel elements;
FIGS. 2 and 3 show sintered bodies having granular fuel particles embedded therein;
FIG. 4 shows in diagrammatic form a different form of fuel element;
FIGS. 5 and 6 show further fuel elements embodying the invention; and
FIG. 7 shows fuel particles with a protective covering.

The fuel element shown in the drawing are particularly, though by no means exclusively suitable for use in a gas or sodium cooled high temperature reactor system.

Practical experiments have shown that it is possible to remove all metallic fission products and halogens by the sintering body which contains the inventive fission binding substances. Many gaseous products, with the exception of inert gases, are bound or retarded by the inventive substances. As the inert gases do not react with organic or inorganic substances, the required security measures are considerably reduced.

Referring now to FIG. 1 it will be seen that the fuel element 6 is in the shape of a four-cornered sleeve. A number of sintered bodies 1 are arranged in the sleeve 6, in such a manner that channels 8 for a coolant such as $CO_2$, inert gases are provided therebetween. The sintered bodies 1 are in the form of plate-like shapes. The sinter material may be graphite powder, $Al_2O_3$, or beryllium or the like therewithin the binding substances according to the invention are dispersed.

Referring now to FIGS. 2 and 3, it will be seen that the fuel particles 2 are embedded in the sintered bodies 1. As will be seen in FIG. 2, the fuel particles 2 are dispersed uniformly within the sintered body 1, some of the fuel particles are visible on the outside surfaces of the sintered body. Such plates can therefore, be used in the interior of a fuel element and not at the exterior thereof. As will be seen in FIG. 3, the fuel particles are provided in layers in the exterior of the body 1, and a covering layer of sintered material of the body 1 is provided therearound, thus making an escape of fission product to the exterior of the body impossible. Such plates might be used as exterior plates in the construction of a fuel element.

As will be seen in FIG. 4, the fuel element comprises a rod-like sintered body 1 having a number of compact fuel bodies 3 axially spaced therein. These fuel bodies 3 are completely surrounded by the sintered material plus binding material, and an escape of fission product to the exterior of the element is impossible.

FIG. 5 shows a fuel element wherein the nuclear fuel particles 2 are formed together with a hydrocarbon addition to a compact 4. The compact 4 is arranged within a spherical or oval sintered body 1.

FIG. 6 shows a fuel element wherein fuel bodies 2, each comprising a particle of nuclear fuel which is covered by a covering 7 to retain fission products are almost uniformly dispersed in the whole of the volume of a sintered body 1, containing also the binding substances.

FIG. 7 shows on an enlarged scale one of the fuel bodies 2 comprising a particle of nuclear fuel encased by a covering 7 to retain fission products.

It will be appreciated that it is not intended to limit the invention to the above examples only, many variations, such as might readily occur to one skilled in the art, being possible, without departing from the scope thereof.

Thus, for example, the sintered bodies may be of any suitable shape, though spheroidal, oval, and square shapes are preferred.

Again, it is not essential for all the fuel particles to be provided with a covering to retain the fission product, as described in the case of the embodiment of FIG. 6.

For a better understanding of the invention an example is given:

A cylindrical compact or body of 3 g. graphite (grain size about 1μ) with a diameter of 12 mm. and a height of 12 mm. contained 1 g. of particles of (U, Th)$C_2$ having a coating of pyrocarbon and SiC. The content of uranium was 1/10 g. enriched to 93%. This compact was subjected to a burnup of 15%. If the graphite is contaminated with the above mentioned substances to about 4 millibarn, the retention properties were increased by the factor 100, as compared to a compact with pure graphite. The compact was subjected to a temperature of up to 2000° C. Everyone skilled in the art can determine the individual constituents necessary for obtaining the 4 millibarn. If the burnup is increased, larger amounts of the above mentioned binding substances are necessary. The maximum amount of the addition lies in the range of the amount of nuclear fuel present in the compact.

The binding of the formed fission products may be either chemically of physically. In the latter case it is even possible to bind the inert gases, for instance on account of absorption. This means that one has to keep in mind the characteristics of the reactor used i.e. the amount of fuel and, the extent of burnup. When the reactor is used for breeding, a larger amount of substances have to be added etc.

It has to be pointed out once again that as binding substances the elements itself as well as their compounds like carbides, oxides, nitrides can be used. The only requirement is that they are able to form non-volatile compounds with the fission products at high and highest temperatures.

What I claim is:

1. In a nuclear fuel element construction, wherein the nuclear fuel is embedded in a moderator matrix, the improvement which comprises that said moderator matrix contains the combination of at least two substances capable of binding fission products and forming therewith non-volatile material, said substances being selected from the group consisting of silver, beryllium, tantalum, molybdenum, silicon, selenium, zirconium and their compounds having affinity to fission products for binding same, said substances being substantially uniformly distributed through the moderator matrix in an amount which is at least about the same as that of the nuclear fuel.

2. The improvement as claimed in claim 1, wherein said compounds are the carbides, oxides or nitrides of said elements.

3. The improvement as claimed in claim 1, further comprising fission product obstructing material for encapsulating the nuclear fuel.

References Cited

UNITED STATES PATENTS

| 2,894,890 | 7/1959 | Saller et al. | 176—91 X |
| 3,089,785 | 5/1963 | Lewis et al. | 176—71 X |
| 3,121,047 | 2/1964 | Stoughton et al. | 176—90 X |
| 3,129,141 | 4/1964 | Burnham et al. | 176—90 X |
| 3,141,829 | 7/1964 | Fortescue et al. | 176—90 X |
| 3,151,037 | 9/1964 | Johnson et al. | 176—91 X |
| 3,158,547 | 11/1964 | Smith | 176—73 X |
| 3,207,697 | 9/1965 | Benesovsky et al. | 176—69 X |
| 3,252,869 | 5/1966 | Koutz | 176—71 X |
| 3,255,277 | 6/1966 | Smith | 176—69 X |

BENJAMIN R. PADGETT, *Primary Examiner.*

M. J. SCOLNICK, *Assistant Examiner.*